United States Patent
Rakshit (10) Patent No.: US 12,001,086 B2
(45) Date of Patent: Jun. 4, 2024

(54) COOLING SYSTEM FOR SMART CONTACT LENSES

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 17/028,411

(22) Filed: Sep. 22, 2020

(65) Prior Publication Data

US 2022/0091441 A1 Mar. 24, 2022

(51) Int. Cl.
G02C 7/04 (2006.01)
G02B 27/01 (2006.01)
G02C 7/08 (2006.01)

(52) U.S. Cl.
CPC ............ *G02C 7/049* (2013.01); *G02B 27/01* (2013.01); *G02C 7/083* (2013.01); *G02B 2027/014* (2013.01)

(58) Field of Classification Search
CPC ........ G02C 7/049; G02C 7/083; G02C 11/10; G02C 7/04; G02B 27/01; G02B 2027/014; G02B 7/028; G02B 27/0176
See application file for complete search history.

(56) References Cited

U.S. PATENT DOCUMENTS

| 3,297,396 A | 1/1967 | Wesley |
| 8,096,654 B2 | 1/2012 | Amirparviz |
| 2015/0032283 A1* | 1/2015 | Kelkar ............... H05K 7/20745 700/300 |
| 2017/0371184 A1* | 12/2017 | Shtukater ........... G02B 27/0093 |
| 2017/0371719 A1* | 12/2017 | Majumdar ............ G06F 9/5094 |
| 2018/0039317 A1* | 2/2018 | Riguer .................. G06F 1/3243 |
| 2018/0224669 A1* | 8/2018 | Shtukater ................. G02C 7/04 |
| 2018/0271408 A1* | 9/2018 | Pletcher ............... A61B 5/1103 |

(Continued)

FOREIGN PATENT DOCUMENTS

| WO | 2017132863 A1 | 8/2017 |
| WO | 2018040078 A1 | 3/2018 |

OTHER PUBLICATIONS

"7 Exciting Developments in the World of Augmented Reality Contacts", PerfectLens.ca, Copyright© 2020 perfectlens All Rights Reserved, 8 pages, retrieved from the internet on Aug. 7, 2020, <https://www.perfectlens.ca/articles/7-exciting-developments-augmented-reality-contacts>.

(Continued)

*Primary Examiner* — Balram T Parbadia
*Assistant Examiner* — Gabriel A Sanz
(74) *Attorney, Agent, or Firm* — Aaron N. Pontikos (57) ABSTRACT

A tool for managing heat generation in smart contact lenses. The tool determines one or more activities to be performed by one or more smart contact lenses. The tool determines a heat generation pattern associated with performance of the one or more activities. The tool assigns the one or more activities to the one or more smart contact lenses based on the heat generation pattern. Responsive to a determination that a pre-determined thermal threshold of the one or more smart contact lenses is exceeded, the tool generates one or more recommendations to perform one or more cooling functions of the one or more smart contact lenses.

20 Claims, 4 Drawing Sheets

(56) References Cited

U.S. PATENT DOCUMENTS

| | | | | |
|---|---|---|---|---|
| 2019/0175012 A1* | 6/2019 | Millar | ................. | A61B 5/14507 |
| 2020/0021502 A1* | 1/2020 | Bernat | ................. | G06F 11/3006 |
| 2020/0026099 A1* | 1/2020 | Jones | ..................... | G02C 7/101 |
| 2021/0096398 A1* | 4/2021 | Hekmat | .............. | H01M 10/425 |
| 2021/0382534 A1* | 12/2021 | Cili | ....................... | H04W 52/00 |

OTHER PUBLICATIONS

"Heat generation in integrated circuits", Wikipedia the free encyclopedia, last edited on Jan. 28, 2019, 2 pages, <https://en.wikipedia.org/wiki/Heat_generation_in_integrated_circuits>.

Anthony, Sebastian, "Graphene smart contact lenses could give you thermal infrared and UV vision", Mar. 17, 2014, ExtremeTech, 9 pages, <https://www.extremetech.com/extreme/178593-graphene-smart-contact-lenses-could-give-you-thermal-infrared-and-uv-vision >.

Ellison, Gordon N., "Thermal analysis of microelectric packages and printed circuit boards using an analytic solution to the heat conduction equation", Advances in Engineering Software, vol. 22, Issue 2, 1995, pp. 99-111.

Hoangk, "How can graphene nanotechnology improve smart contact lenses?", Mar. 14, 2018, blog post, Sustainable Nano, a blog by the Center for Sustainable Nanotechnology, 15 pages, <http://sustainable-nano.com/2018/03/14/graphene-nanotechnology-smart-contact-lenses/>.

Otman, Haley, "Smart Contact Lenses Could Record Everything You See", Jun. 28, 2017, Curiosity, 4 pages, https://curiosity.com/topics/smart-contact-lenses-could-record-everything-you-see-curiosity/>.

Park et al., "Soft, smart contact lenses with integrations of wireless circuits, glucose sensors, and displays", Research Article, Applied Sciences & Engineering, Science Advances, Jan. 24, 2018, vol. 4, No. 1, eaap9841, DOI: 10.1126/sciadv.aap9841, 24 pages, <https://advances.sciencemag.org/content/4/1/eaap9841>.

Sherr, Ian, "You've heard of AR glasses, but this startup wants to make them into contact lenses", Nov. 14, 2018, CNET, 4 pages, <https://www.cnet.com/news/youve-heard-of-ar-glasses-but-this-startup-wants-to-make-them-into-contact-lenses/>.

* cited by examiner

COOLING SYSTEM FOR SMART CONTACT LENSES

BACKGROUND OF THE INVENTION

The present invention relates generally to cognitive computing systems, and more particularly to a cooling system for smart contact lenses.

Smart contact lenses are contact lenses capable of projecting information into a field of vision of a user. Further these smart contact lenses are capable of allowing a user to engage in augmented reality (AR) technology. Some smart contact lenses include a display, a camera, and an antennae, and are capable of superimposing computer-generated imagery (CGI) over a field of vision of a user.

SUMMARY

Aspects of an embodiment of the present invention disclose a method, a computer program product, and a computer system for managing heat generation in smart contact lenses. The method includes determining, by one or more computer processors, one or more activities to be performed by one or more smart contact lenses. The method further includes determining, by the one or more computer processors, a heat generation pattern associated with performance of the one or more activities. The method further includes assigning, by the one or more computer processors, the one or more activities to the one or more smart contact lenses based on the heat generation pattern. Responsive to a determination that a pre-determined thermal threshold of the one or more smart contact lenses is exceeded, the method further includes generating, by the one or more computer processors, one or more recommendations to perform one or more cooling functions of the one or more smart contact lenses.

DETAILED DESCRIPTION

Embodiments of the present invention recognize that when smart contact lenses are used extensively, significant heat can be generated that may create an unusual sensation within the eyes of a user. Embodiments of the present invention further recognize that as smart contact lens computing power and capability increase, temperatures within the eyes of a user will similarly increase. Embodiments of the present invention further recognize a need for a proper cooling system integrated within a smart contact lens to effectively control temperatures within the eyes of a user.

Embodiments of the present invention provide the capability to apply and manage effective cooling within a smart contact lens on a continuous basis to prevent overheating and provide a comfortable experience for a user of smart contact lenses.

The inventor has further observed and/or recognized that a user can wear smart contact lenses capable of performing various computational needs, as the smart contact lenses will be integrated with various functionalities and capabilities, such as augmented reality, digital cameras, video recording, transferring recorded video to a mobile device, etc.

The inventor has further observed and/or recognized that for smart contact lenses to provide and support the above mentioned functionalities, multiple circuits within the smart contact lenses will be generating heat during heavy duty applications of these functionalities.

Implementation of such embodiments may take a variety of forms, and exemplary implementation details are discussed subsequently with reference to the Figures.

Figure 1:
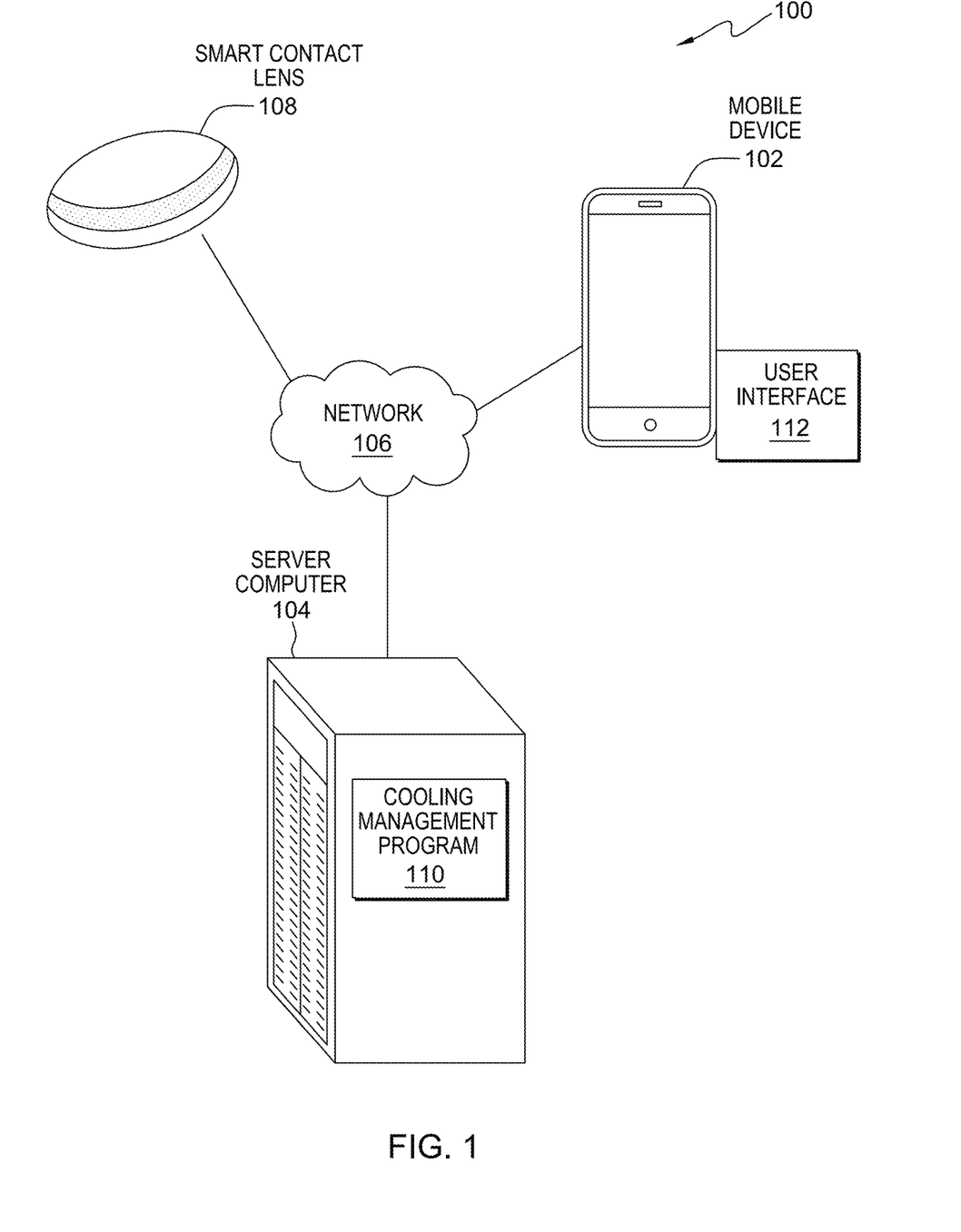
FIG. 1 is a functional block diagram illustrating a data processing environment suitable for operation of a cooling management program for cooling smart contact lenses, in accordance with an embodiment of the present invention.

Referring now to various embodiments of the invention in more detail, FIG. 1 is a functional block diagram of a distributed data processing environment, generally designated 100, suitable for operation of a cooling management program in accordance with at least one embodiment of the invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes mobile device 102 and server computer 104, and smart contact lens 108, all interconnected over network 106. Network 106 can be, for example, a telecommunications network, a local area network (LAN), a wide area network (WAN), such as the Internet, or a combination of the three, and can include wired, wireless, or fiber optic connections. Network 106 may include one or more wired and/or wireless networks that are capable of receiving and transmitting data, voice, and/or video signals, including multimedia signals that include voice, data, and video information. In general, network 106 may be any combination of connections and protocols that will support communications between mobile device 102, server computer 104, and smart contact lens 108, as well as other computing devices (not shown) within distributed data processing environment 100. FIG. 1 is intended as an example and not as an architectural limitation for the different embodiments.

In one embodiment, mobile device 102 may be a laptop computer, tablet computer, smartphone, smartwatch, or any programmable electronic device capable of communicating with various components and devices within distributed data processing environment 100, via network 106. In general, mobile device 102 may represent any programmable electronic device or combination of programmable electronic devices capable of executing machine readable program instructions and communicating with other computing devices (not shown) within distributed data processing environment 100 via a network, such as network 106. More specifically, mobile device 102 represents any device capable of sending and receiving signals, monitoring data, and analyzing signal feedback. In another embodiment, mobile device 102 may represent a sensor, or a collection of connected sensors (i.e., paired smart watch, and any other wearable electronic device, etc.), capable of sending and receiving signals, monitoring data, and analyzing signal feedback related to heat generation within a smart contact lens, such as smart contact lens 108. In yet another embodiment, mobile device 102 is a mobile device capable of connecting to, or being paired with, a smart contact lens, such as smart contact lens 108, via a wireless or proximity type connection. In one embodiment, mobile device 102 is capable of communicating with server computer 104, cooling management program 110, and smart contact lens 108. In one embodiment, mobile device 102 may include application software that supports functionality provided by cooling management program 110, or acts as an agent application for cooling management program 110. In one embodiment, mobile device 102 includes user interface 112.

In one embodiment, user interface 112 provides an interface between a user of mobile device 102, cooling management program 110, and server computer 104. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 112 may also be mobile application software that provides an interface between a user of mobile device 102, smart contact lens 108, cooling management program 110, and server computer 104. Mobile application software, or an "app," is a computer program that runs on smartphones, tablet computers, smartwatches and any other mobile devices.

In one embodiment, server computer 104 can be a stand-alone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In an embodiment, server computer 104 represents a computing system utilizing clustered computers and components (e.g., database server computers, application server computers, etc.) that act as a single pool of seamless resources when accessed within distributed data processing environment 100. Server computer 104 includes cooling management program 110 communicatively coupled to server computer 104, and facilitates communication between cooling management program 110, mobile device 102, and smart contact lens 108. Server computer 104 may include internal and external hardware components, as depicted and described in further detail with respect to FIG. 4.

In one embodiment, cooling management program 110 operates on a central server, such as server computer 104 and may be utilized by one or more mobile devices, such as mobile device 102, and smart contact lens 108, via network 106. In another embodiment, cooling management program 110 may be a program downloaded from the central server or a third-party provider (not shown), and executed on a mobile device, such as mobile device 102, for managing cooling of circuit layers within a smart contact lens, such as smart contact lens 108. In another embodiment, cooling management program 110 may be a program installed on one or more smart contact lenses to be executed by one or more embedded computer processors. In yet another embodiment, cooling management program 110 may be utilized as a software service provided by a third-party cloud service provider (not shown). In yet another embodiment, cooling management program 110 may include one or more components, such as add-ons, plug-ins, and agent programs, etc., installed on one or more mobile devices, such as mobile device 102, to monitor heat generated from a smart contact lens, such as smart contact lens 108, and manage temperatures within the smart contact lens.

In one embodiment, cooling management program 110 is a program for providing the capability to manage heat generation in a smart contact lens, such as smart contact lens 108. In one embodiment, cooling management program 110 provides the capability to utilize heat dissipating thermal conductive materials within a smart contact lens, such as smart contact lens 108, to manage cooling of one or more electronic circuits within the smart contact lens during operation. In one embodiment, cooling management program 110 provides the capability to predict activities to be performed by a smart contact lens, such as smart contact lens 108, and based, at least in part, on a heat generation pattern for the activities, distribute activity performance load between one or more additional smart contact lenses. In one embodiment, cooling management program 110 provides the capability to manage cooling of a smart contact lens, such as smart contact lens 108, on a continuous basis, such that the smart contact lens does not overheat while performing one or more activities. In one embodiment, cooling management program 110 provides the capability to automatically and dynamically assign specific activities to one or more smart contact lenses, such as smart contact lens 108, based on historical heat generation patterns associated with the specific activities. In another embodiment, in a multi-user collaborative environment, cooling management program 110 provides the capability to distribute one or more activities across one or more smart contact lenses of multiple users, such that heat generated from various activities can be uniformly shared amongst the one or more smart contact lenses of the multiple users.

In one embodiment, smart contact lens 108 is a smart contact lens interconnected with a server, such as server computer 104, and a mobile device, such as mobile device 102, via a network, such as network 106. In another embodiment, smart contact lens 108 is a smart device capable of wirelessly pairing with a server computer, such as server computer 104, a mobile device, such as mobile device 102, and capable of communicating with a program on a server, such as cooling management program 110 on server computer 104. In one embodiment, smart contact lens 108 is a smart contact lens capable of being worn by a user to perform various functionalities, such as video recording, digital image recording, camera functionality, augmented reality, virtual reality (VR), and various other functions, activities, and computational tasks supported by a smart contact lens that are known, or will be known, in the art. In one embodiment, smart contact lens 108 includes a heat dissipation region capable of controlling temperatures of smart contact lens 108 while worn by a user and during performance of various activities. A configuration of smart contact lens 108 will be discussed in further detail below in FIG. 2.

Figure 2:
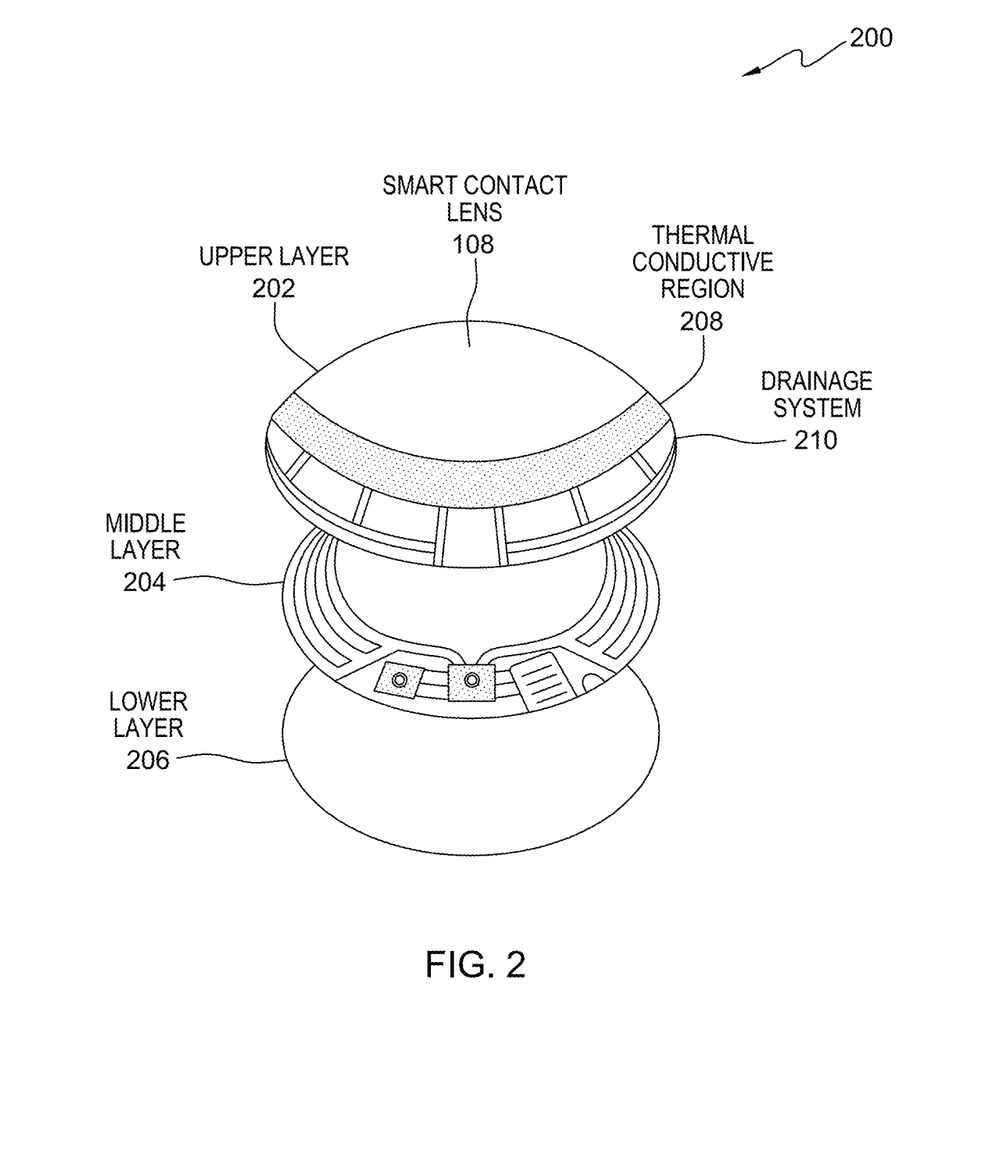
FIG. 2 is a configuration diagram illustrating a smart contact lens, in accordance with an embodiment of the present invention.

FIG. 2 is a configuration diagram illustrating a configuration of a smart contact lens, such as smart contact lens 108 of FIG. 1, generally designated 200, in accordance with an embodiment of the present invention.

Smart contact lens 108 includes upper layer 202, middle layer 204, and lower layer 206. In one embodiment, upper layer 202 of smart contact lens 108 is exposed to open air in an external environment outside of an eye of a user, and also covers middle layer 204. In one embodiment, upper layer 202 of smart contact lens 108 includes thermal conductive region 208 and drainage system 210 for providing a cooling mechanism for heat generated within middle layer 204 of smart contact lens 108. In one embodiment, an area of upper layer 202 that covers a pupil in an eye of a user is transparent, such that light passes through upper layer 202 to the pupil in the eye of the user. In one embodiment, upper layer 202 is seamlessly connected to middle layer 204, such that thermal conductive region 208 and drainage system 210 are able to provide cooling to one or more electronic circuits within middle layer 204. In one embodiment, middle layer 204 of smart contact lens 108 includes one or more electronic circuits and various other components, including, but not limited to, a controller, a thermal sensor, and a capacitor, etc., embedded within middle layer 204 for providing computational functionalities supported by smart contact lens 108. In one embodiment, middle layer 204 is seamlessly connected to lower layer 206. In one embodiment, lower layer 206 of smart contact lens 108 is a soft membrane that rests upon an eye of a user and separates middle layer 204 from the eye of the user.

In one embodiment, thermal conductive region 208 and drainage system 210 within upper layer 202 provide cooling to middle layer 204 by facilitating heat dissipation utilizing a direct liquid-based cooling system. In one embodiment, thermal conductive region 208 of smart contact lens 108 includes a suitable thermal conductive material capable of dissipating heat generated within middle layer 204 of smart contact lens 108. In one embodiment, thermal conductive region 208 of smart contact lens 108 is located at the periphery of upper layer 202 of smart contact lens 108, such that thermal conductive region 208 forms a continuous ring of thermal conductive material around the entire periphery of upper layer 202 of smart contact lens 108. In another embodiment, thermal conductive region 208 may include an array of multiple areas that contain thermal conductive material. In one embodiment, thermal conductive region 208 is connected to middle layer 204 where the one or more electronic circuits are embedded, such that thermal conductive region 208 can provide direct liquid-based cooling to the one or more electronic circuits. In one embodiment, thermal conductive region 208 provides an area for tears and moisture from an eye of a user to come in contact with (i.e., wash over) the thermal conductive material, effectively cooling the one or more electronic circuits of middle layer 204. For example, when a user performs blinking cycles, tears will wash over the thermal conductive region 208, wetting the thermal conductive material, and providing heat dissipation of one or more electronic circuits within middle layer 204 via a direct liquid-based cooling effect, as well as an evaporative and convective cooling process, since upper layer 202 and thermal conductive region 208 are also exposed to external air-based cooling from an external outside environment. In one embodiment, comparatively hot tears pass through drainage system 210 of upper layer 202 to evacuate the hot tears from thermal conductive region 208, which facilitates a continuous cooling effect by transferring the comparatively hot tears out of thermal conductive region 208, to be replenished with cooler tears that contact thermal conductive region 208 during subsequent blinking cycles.

Figure 3:
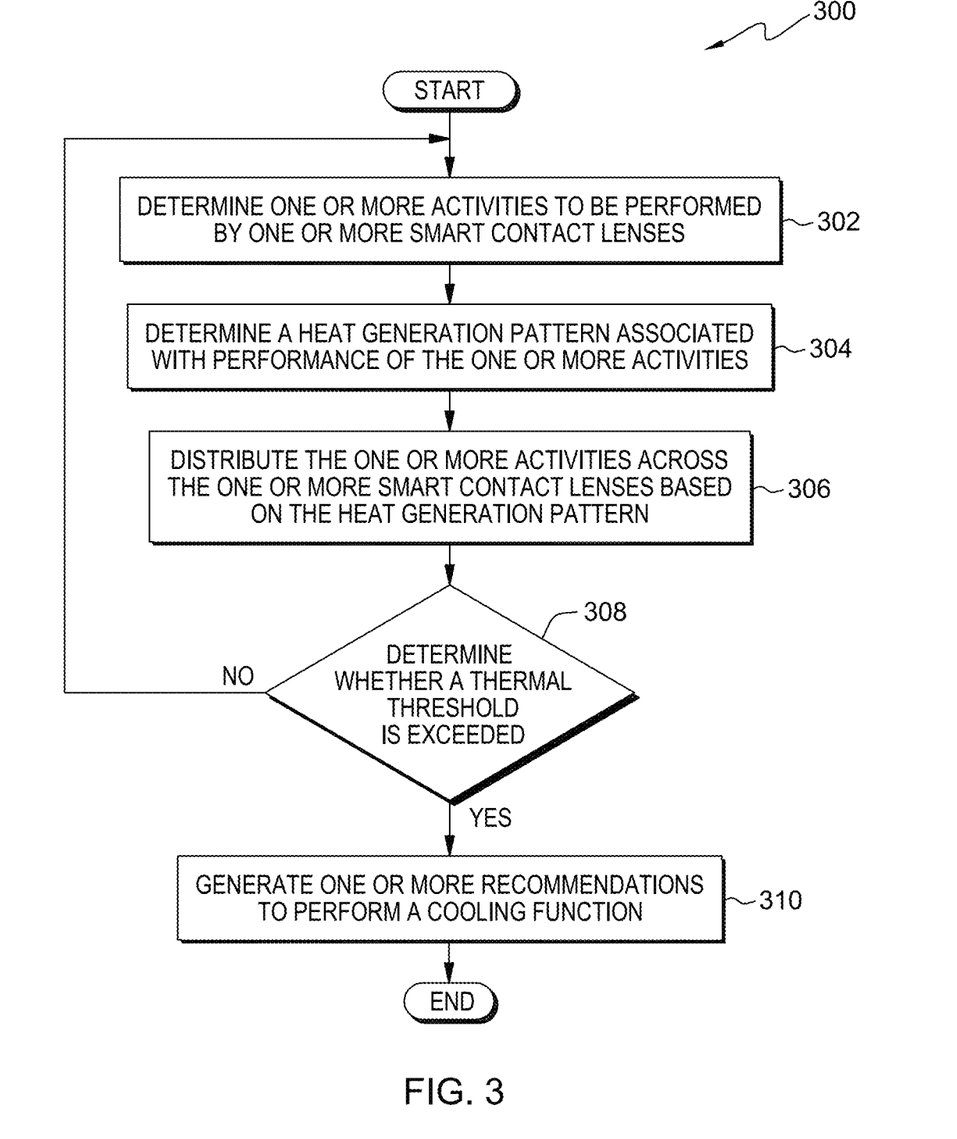
FIG. 3 is a flowchart depicting operational steps of a cooling management program, in accordance with an embodiment of the present invention.

FIG. 3 depicts a flowchart of operational steps of a cooling management program, such as cooling management program 110 of FIG. 1, generally designated 300, for managing heat generation in a smart contact lens, in accordance with an embodiment of the present invention.

Cooling management program 110 determines one or more activities to be performed by one or more smart contact lenses (302). In one embodiment, cooling management program 110 determines one or more activities to be performed by one or more smart contact lenses by identifying the one or more smart contact lenses, such as smart contact lens 108, a unique identifier, such as an electronic serial number, a radio frequency identification (RFID) tag, a wireless 6-byte unique identifier, a wireless internet protocol, or any other suitable means for uniquely identifying a smart contact lens, associated with each of the one or more smart contact lenses. In one embodiment, cooling management program 110 determines one or more core functions provided by the one or more smart contact lenses, where the one or more core functions include input functions and one or more output functions that enable performance of the one or more activities by the one or more smart contact lenses. In one embodiment, input functions for the one or more smart contact lenses, such as smart contact lens 108, can include a camera lens, a moisture sensor, a temperature sensor, a motion sensor, etc., and output functions for the one or more smart contact lenses can include a display, such as a heads up display (HUD). In one embodiment, each of the one or more smart contact lenses will be paired to a mobile device of a user, such as mobile device 102. In one embodiment, cooling management program 110 monitors activity on the mobile device of the user, such as mobile device 102, to determine one or more activities to be performed by the one or more smart contact lenses, such as smart contact lens 108. For example, cooling management program 110 may monitor activity on a mobile device of a user, such as mobile device 102, determine one or more applications, such as a photo application, video application, etc., which the user is interacting with that are supported by an input function and an output function of a paired smart contact lens, such as smart contact lens 108, and further determine one or more activities to be performed by the smart contact lens, such as take a photo. In this example, where the user is interacting with a camera application, cooling management program 110 determines that the activity of capturing an image is supported by a camera lens input function and a display output function of the paired smart contact lens, and further determines that the activity is to be performed by the paired smart contact lens utilizing the input/output functions.

Cooling management program 110 determines a heat generation pattern associated with performance of the one or more activities (304). In one embodiment, cooling management program 110 determines a heat generation pattern associated with performance of the one or more activities by retrieving historical heat generation data associated with performance of one or more activities over a period of time, where the historical heat generation data is gathered by a thermal sensor within a smart contact lens, such as smart contact lens 108. For example, cooling management program 110 is able to retrieve historical heat generation data associated with performance of a video recording function on one or more smart contact lenses, such as smart contact lens 108, where the historical heat generation data evidences an increase in overall temperature of the one or more smart contact lenses during heavy video recording tasks (e.g., time lapse video recording, high resolution slow motion video recording, etc.), and based on the retrieved historical heat generation data, cooling management program 110 determines a heat generation pattern associated with performance of video recording (e.g., more intense recording tasks generate more intense heat). In one embodiment, cooling management program 110 determines a heat generation pattern associated with performance of the one or more activities by identifying a heat generation rate. For example, cooling management program 110 is able to retrieve historical heat generation data associated with performance of an augmented reality function on one or more smart contact lenses, such as smart contact lens 108, where the historical heat generation data evidences a spike in a rate of heat generation of the one or more smart contact lenses during prolonged augmented reality experiences, and based on the retrieved historical heat generation data, cooling management program 110 determines a heat generation pattern associated with performance of an augmented reality functionality that supports increased rates in temperature increase across the one or more smart contact lenses (e.g., prolonged augmented reality activities generate more intense heat at an increased rate). In one embodiment, cooling management program 110 determines a heat generation pattern associated with performance of the one or more activities by identifying a thermal load imposed on one or more smart contact lenses, such as smart contact lens 108, during performance of the one or more activities, a thermal load imposed on the one or more smart contact lenses by wireless recharging cycles of the one or more smart contact lenses, and a heat dissipation rate associated with thermal conductive material used within the one or more smart contact lenses, etc. For example, a heat generation pattern for two smart contact lenses, such as smart contact lens 108, performing the same activity may vary based on a heat dissipation rate associated with different thermal conductive material used in the two smart contact lenses, such as copper versus another suitable thermal conductive material.

In one embodiment, cooling management program 110 stores the determined heat generation patterns associated with one or more activities, such that cooling management program 110 is able to reference the determined heat generation patterns to inform future cooling management decisions based on expected heat generation rates (e.g., temperature increases over a period of time) and heat generation levels (e.g., max temperature for a specific activity) during performance of the one or more activities.

Cooling management program 110 distributes the one or more activities across the one or more smart contact lenses based on the heat generation pattern (306). In one embodiment, cooling management program 110 distributes the one or more activities across the one or more smart contact lenses based on the heat generation pattern by monitoring the heat generation patterns for the one or more activities being performed using the one or more smart contact lenses, such as smart contact lens 108, and based, at least in part, on a comparison of the heat generation patterns to historical heat generation patterns for performance of similar activities, cooling management program 110 dynamically assigns the one or more activities to each of the one or more smart contact lenses, such that each of the one or more smart contact lenses share the heat generation in a uniform distribution. In one embodiment, cooling management program 110 transfers the one or more activities between the one or more smart contact lenses seamlessly during performance to maintain a heat generation pattern that produces a total thermal load on the one or more smart contact lenses (i.e., generated heat, overall temperature, etc.) below a pre-determined thermal threshold.

For example, in a scenario where a user is wearing two smart contact lenses, such as smart contact lens 108, and is simultaneously performing a video recording activity in a first smart contact lens, and an image transfer to a mobile device, such as mobile device 102, in a second smart contact lens, cooling management program 110 tracks a heat generation pattern for each of the activities being performed by the two smart contact lenses. Where the second smart contact lens, performing the image transfer, is generating more heat than the first contact lens, performing the video recording activity, cooling management program 110 seamlessly transfers the image transfer to the first smart contact lens, and the video recording activity to the second smart contact lens, to distribute a thermal load on the two smart contact lenses evenly, thus maintaining a heat generation pattern that prevents either of the two smart contact lenses from overheating (i.e., exceeding a pre-determined thermal threshold) during operation.

In another example, in a multi-user scenario where two or more users are wearing a plurality of smart contact lenses, such as smart contact lens 108, and performing a plurality of activities, cooling management program 110 tracks heat generation patterns for each of the plurality of activities, where tracking the heat generation patterns can include predicting a duration of performance of the plurality of activities and expected heat generation patterns for the plurality of activities where performance is maintained for the predicted duration. Where a predicted duration of performance of the activities and an expected heat generation pattern for the plurality of activities indicate that one of the plurality of smart contact lenses can exceed a pre-determined thermal threshold, cooling management program 110 redistributes performance of the plurality of activities across the two or more users wearing the plurality of smart contact lenses to maintain a heat generation pattern that prevents any of the plurality of smart contact lenses from overheating during operation.

Cooling management program 110 determines whether a thermal threshold is exceeded (decision block 308). In one embodiment, cooling management program 110 determines whether a thermal threshold is exceeded by monitoring a heat generation pattern associated with performance of one or more activities by one or more smart contact lenses, such as smart contact lens 108, and a total thermal load on the one or more smart contact lenses, and comparing the heat generation pattern and the total thermal load to a pre-determined thermal threshold. In one embodiment, the total thermal load is a measurable temperature of a smart contact lens, such as smart contact lens 108, during operation, that considers any cooling methods already applied (e.g., direct liquid-based cooling, air-based cooling, combinations of cooling methods, etc.). In one embodiment, the pre-determined thermal threshold can be a thermal threshold that indicates a temperature at which user comfort (e.g., heat experienced on an eye of a user) and smart contact lens component durability (i.e., membrane layers, electronic circuitry, etc.) becomes compromised. Where cooling management program 110 determines that a heat generation pattern and a total thermal load (a measurable temperature) on one or more smart contact lenses is above the pre-determined thermal threshold, cooling management program 110 determines that the thermal threshold is exceeded. Where cooling management program 110 determines that a heat generation pattern and a total thermal load (a measurable temperature) on one or more smart contact lenses is below the pre-determined thermal threshold, cooling management program 110 determines that the thermal threshold is not exceeded.

Responsive to a determination that the thermal threshold is not exceeded, cooling management program 110 returns to determining the one or more activities to be performed by the one or more smart contact lenses (302). In one embodiment, a determination that the thermal threshold is not exceeded indicates that the thermal conductive material and applied cooling methods, relative to the heat generation pattern associated with performance of one or more activities, is sufficient to control heat being generated within the one or more smart contact lenses.

Responsive to a determination that the thermal threshold is exceeded, cooling management program 110 generates one or more recommendations to perform a cooling function (310). In one embodiment, a determination that the thermal threshold is not exceeded indicates that the thermal conductive material and applied cooling methods, relative to the heat generation pattern associated with performance of one or more activities, is insufficient to control heat being generated within the one or more smart contact lenses. In one embodiment, cooling management program 110 generates one or more recommendations to perform a cooling function by determining a heat dissipation rate sufficient to reduce the total thermal load on the one or more smart contact lenses, such as smart contact lens 108, below the thermal threshold. In one embodiment, cooling management program 110 determines a cooling function (i.e., a cooling method) that is able to provide the heat dissipation rate sufficient to reduce the total thermal load on the one or more smart contact lenses. For example, cooling management program 110 may determine a blinking cycle for a specific duration of time provides a heat dissipation rate sufficient to reduce the total thermal load on the one or more smart contact lenses. In another example, cooling management program 110 may determine a blinking cycle for a specific duration of time fails to provide a heat dissipation rate sufficient to reduce the total thermal load on the one or more smart contact lenses, and instead determines that lowering an ambient room temperature via a smart thermostat paired to a mobile device, such as mobile device 102, provides a heat dissipation rate sufficient to reduce the total thermal load. In yet another example, cooling management program 110 may determine that a user should end performance of one or more activities, or remove the smart contact lens for a period of time, to provide a heat dissipation rate sufficient to reduce the total thermal load on the one or more smart contact lenses. In one embodiment, cooling management program 110 generates one or more recommendations to provide the determined cooling function that will provide a heat dissipation rate sufficient to reduce the total thermal load on the one or more smart contact lenses. In one embodiment, cooling management program 110 is able to provide the one or more generated recommendations as an alert sent to the one or more smart contact lenses, such as smart contact lens 108, and as a notification to a mobile device, such as mobile device 102.

Figure 4:
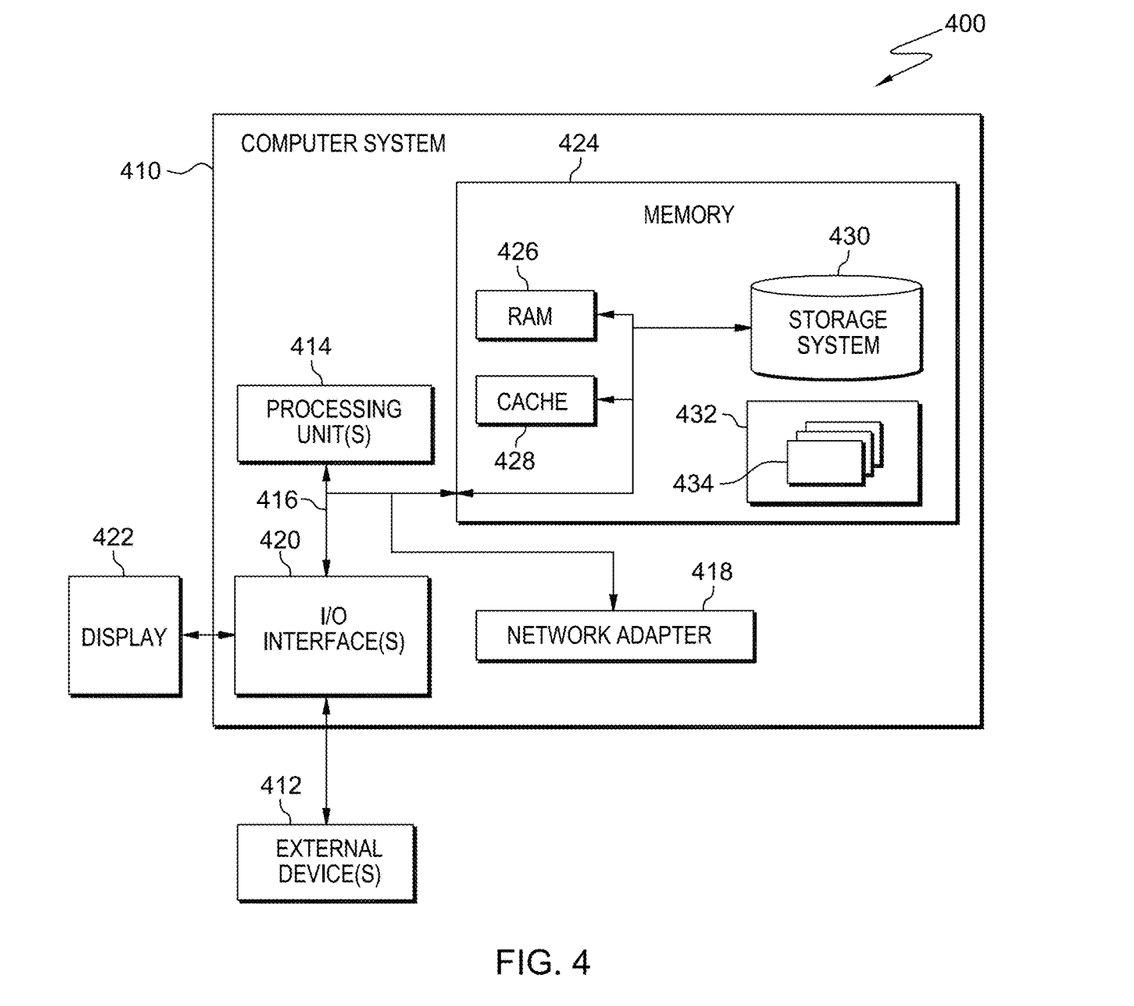
FIG. 4 is a block diagram depicting components of a data processing system (e.g., server computer of FIG. 1), in accordance with an embodiment of the present invention.

FIG. 4 depicts a block diagram of components of data processing system, such as server computer 104 of FIG. 1, generally designated 400, in accordance with an illustrative embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, server computer 104 in distributed data processing environment 100 is shown in the form of a general-purpose computing device, such as computer system 410. The components of computer system 410 may include, but are not limited to, one or more processors or processing unit(s) 414, memory 424 and bus 416 that couples various system components including memory 424 to processing unit(s) 414.

Bus 416 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 410 typically includes a variety of computer system readable media. Such media may be any available media that is accessible by computer system 410 and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example and not limitation, as well as an operating system, one or more application programs, other program modules and program data. Each of the operating systems, one or more application programs, other program modules and program data or some combination thereof, may include an implementation of a networking environment. Program modules 434 generally carry out the functions and/or methodologies of embodiments of the invention as described herein. Computer system 410 may also communicate with one or more external device(s) 412, such as a keyboard, a pointing device, a display 422, etc. or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks, such as a local area network (LAN), a general wide area network (WAN) and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives and data archival storage systems may be used in conjunction with computer system 410.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method comprising:
   determining, by one or more computer processors, one or more activities to be performed by one or more smart contact lenses;
   determining, by the one or more computer processors, a respective historical heat generation pattern associated with performance of each of the one or more activities by each of the one or more smart contact lenses;
   assigning, by the one or more computer processors, the one or more activities to the one or more smart contact lenses based on the respective historical heat generation pattern associated with performance of each of the one or more activities;
   determining, by the one or more computer processors, that a first heat generation pattern associated with a first activity being performed by the smart contact lens is higher than a second heat generation pattern associated with a second activity being performed by a second contact lens;
   seamlessly transferring, by the one or more processors: (i) performance of the first activity from the first smart contact lens to the second contact lens, and (ii) performance of the second activity from the second smart contact lens to the first contact lens, to maintain respective thermal thresholds that are below a predetermined thermal threshold; and
   responsive to a determination that the pre-determined thermal threshold of the one or more smart contact lenses is exceeded, generating, by the one or more computer processors, one or more recommendations to perform one or more cooling functions of the one or more smart contact lenses.

2. The method of claim 1, wherein each of the one or more smart contact lenses includes a thermal conductive region and a drainage system within an upper layer, wherein the upper layer is exposed to an external outside environment.

3. The method of claim 2, wherein the thermal conductive region includes one or more thermal conductive materials that dissipate heat generated by one or more circuits embedded within a middle layer.

4. The method of claim 1, wherein determining the one or more activities to be performed further comprises:
   monitoring, by the one or more computer processors, activity on a mobile device paired to the one or more smart contact lenses to determine a function associated with the activity that is supported by at least one of the one or more smart contact lenses.

5. The method of claim 1, wherein assigning the one or more activities further comprises:
   assigning, by the one or more computer processors, the one or more activities to each of the one or more smart contact lenses seamlessly during performance of the one or more activities to maintain a heat generation pattern that imposes a thermal load on each of the one or more smart contact lenses that is below the pre-determined thermal threshold.

6. The method of claim 5, further comprising:
   assigning, by the one or more computer processors, the one or more activities to each of the one or more smart contact lenses to distribute the thermal load on each of the one or more smart contact lenses uniformly to prevent the one or more smart contact lenses exceeding the pre-determined thermal threshold during the performance of the one or more activities.

7. The method of claim 1, wherein generating one or more recommendations, further comprises:
   determining, by the one or more computer processors, a heat dissipation rate sufficient to reduce a thermal load on the one or more smart contact lenses below the pre-determined thermal threshold of the one or more smart contact lenses; and
   determining, by the one or more computer processors, the one or more cooling functions that provide the heat dissipation rate sufficient to reduce the thermal load on the one or more smart contact lenses, wherein the one or more cooling functions of the one or more smart contact lenses include a blinking cycle for a specific duration of time.

8. The computer-implemented method of claim 1, wherein a heat generation pattern associated with an activity being performed by a smart contact lens is based on a thermal load imposed on the smart contact lens during performance of the activity, a thermal load imposed on the smart contact lens by wireless recharging cycles of the smart contact lens, and a heat dissipation rate associated with one or more thermal conductive materials used within the smart contact lens.

9. The computer-implemented method of claim 1, wherein the pre-determined thermal threshold of a smart contact lens is a temperature on an eye of a user wearing the smart contact lens at which user comfort becomes compromised.

10. The computer-implemented method of claim 1, wherein the pre-determined thermal threshold of a smart contact lens is a temperature at which the smart contact lens component durability becomes compromised.

11. A computer program product comprising:
   one or more computer readable storage media and program instructions stored on the one or more computer readable storage media, the stored program instructions comprising:
   program instructions to determine one or more activities to be performed by one or more smart contact lenses;
   program instructions to determine a respective historical heat generation pattern associated with performance of each of the one or more activities by each of the one or more smart contact lenses;
   program instructions to assign the one or more activities to the one or more smart contact lenses based on the respective historical heat generation pattern associated with performance of each of the one or more activities;
   program instructions to determine that a first heat generation pattern associated with a first activity being performed by the smart contact lens is higher than a second heat generation pattern associated with a second activity being performed by a second contact lens;

program instructions to seamlessly transfer: (i) performance of the first activity from the first smart contact lens to the second contact lens, and (ii) performance of the second activity from the second smart contact lens to the first contact lens, to maintain respective thermal thresholds that are below a predetermined thermal threshold; and program instructions to, responsive to a determination that the pre-determined thermal threshold of the one or more smart contact lenses is exceeded, generate one or more recommendations to perform one or more cooling functions of the one or more smart contact lenses.

12. The computer program product of claim 11, wherein each of the one or more smart contact lenses includes a thermal conductive region and a drainage system within an upper layer, wherein the upper layer is exposed to an external outside environment.

13. The computer program product of claim 12, wherein the thermal conductive region includes one or more thermal conductive materials that dissipate heat generated by one or more circuits embedded within a middle layer.

14. The computer program product of claim 11, wherein the program instructions to determine the one or more activities to be performed further comprise:

program instructions to monitor activity on a mobile device paired to the one or more smart contact lenses to determine a function associated with the activity that is supported by at least one of the one or more smart contact lenses.

15. The computer program product of claim 11, wherein the program instructions to assign the one or more activities further comprise:

program instructions to assign the one or more activities to each of the one or more smart contact lenses seamlessly during performance of the one or more activities to maintain a heat generation pattern that imposes a thermal load on each of the one or more smart contact lenses that is below the pre-determined thermal threshold.

16. The computer program product of claim 15, wherein the stored program instructions further comprise:

program instructions to assign the one or more activities to each of the one or more smart contact lenses to distribute the thermal load on each of the one or more smart contact lenses uniformly to prevent the one or more smart contact lenses exceeding the pre-determined thermal threshold during performance of the one or more activities.

17. The computer program product of claim 11, wherein the program instructions to generate the one or more recommendations further comprise:

program instructions to determine a heat dissipation rate sufficient to reduce a thermal load on the one or more smart contact lenses below the pre-determined thermal threshold of the one or more smart contact lenses; and program instructions to determine the one or more cooling functions that provide the heat dissipation rate sufficient to reduce the thermal load on the one or more smart contact lenses, wherein the one or more cooling functions of the smart contact lenses include a blinking cycle for a specific duration of time.

18. A computer system comprising:

one or more computer processors;

one or more computer readable storage media; and program instructions stored on at least one of the one or more computer readable storage media for execution by at least one of the one or more computer processors, the program instructions comprising:

program instructions to determine one or more activities to be performed by one or more smart contact lenses;

program instructions to determine a respective historical heat generation pattern associated with performance of each of the one or more activities by each of the one or more smart contact lenses;

program instructions to assign the one or more activities to the one or more smart contact lenses based on the respective historical heat generation pattern associated with performance of each of the one or more activities;

program instructions to determine that a first heat generation pattern associated with a first activity being performed by the smart contact lens is higher than a second heat generation pattern associated with a second activity being performed by a second contact lens;

program instructions to seamlessly transfer: (i) performance of the first activity from the first smart contact lens to the second contact lens, and (ii) performance of the second activity from the second smart contact lens to the first contact lens, to maintain respective thermal thresholds that are below a predetermined thermal threshold; and program instructions to, responsive to a determination that the pre-determined thermal threshold of the one or more smart contact lenses is exceeded, generate one or more recommendations to perform one or more cooling functions of the one or more smart contact lenses.

19. The computer system of claim 18, wherein each of the one or more smart contact lenses includes a thermal conductive region and a drainage system within an upper layer, wherein the upper layer is exposed to an external outside environment.

20. The computer system of claim 19, wherein the thermal conductive region includes one or more thermal conductive materials that dissipate heat generated by one or more circuits embedded within a middle layer.

* * * * *